United States Patent [19]

Suzuki et al.

[11] 4,351,599
[45] Sep. 28, 1982

[54] CAMERA

[75] Inventors: Toyotosi Suzuki, Tokyo; Mutsuhide Matsuda, Yokohama; Hideo Tamamura, Tokyo, all of Japan

[73] Assignee: Canon Kabushiki Kaisha, Tokyo, Japan

[21] Appl. No.: 253,409

[22] Filed: Apr. 13, 1981

[30] Foreign Application Priority Data

Apr. 17, 1980 [JP] Japan .................................. 55-51881

[51] Int. Cl.³ ............................................. G03B 17/02
[52] U.S. Cl. .................................... 354/288; 354/173
[58] Field of Search ................ 354/173, 202, 288, 224

[56] References Cited

U.S. PATENT DOCUMENTS 2,969,722  1/1961  Schwartz .......................... 354/173

Primary Examiner—John Gonzales
Attorney, Agent, or Firm—Toren, McGeady & Stanger

[57] ABSTRACT

In a camera using 35 mm cartridge-contained film and having incorporated therein an automatic winding and rewinding mechanism with the height of the camera housing reduced to a minimum value depending upon the longitudinal length of the film cartridge, the finder portion is arranged between the cartridge chamber at one of the shorter sides of the exposure aperture opening of the camera and the outer side panel of the camera housing, and a battery chamber capable of accommodating penlight (size AA) batteries is arranged between the winding chamber at the other shorter side of the exposure aperture opening and the outer side panel of the camera housing.

4 Claims, 2 Drawing Figures

CAMERA

BACKGROUND OF THE INVENTION

1. Field of the Invention

This invention relates to the body structure of a camera using 35 mm roll film and having incorporated therein a mechanism for automatically winding and rewinding this film.

2. Description of the Prior Art

In recent years, in the art of cameras using 35 mm film in cartridges, progress has occurred in the automation of such cameras. At the present time, such cameras have incorporated therein an electric motor drive for automation of the winding and rewinding of the film, an automatic flash exposure control and other similar advances. However, such cameras are required to be in a form such that a number of unit type dry batteries which operate as the electrical power supply source to the electric motor and the stroboscope be provided in the interior of the camera body, inasmuch as the button type mercury battery or silver battery which is accepted in many of the conventional cameras is found insufficient in capacity.

However, in the conventional type of camera little consideration has been given to provision of an advantageous layout for incorporating therein the above-described apparatus and the unit type of dry batteries in the interior of the camera body. Therefore, such cameras usually involve comparatively large bulk and size of the camera body. Thus, advantageous features such as improved portability are unavoidably sacrificed to some extent.

SUMMARY OF THE INVENTION

The present invention is directed toward overcoming the disadvantages described above, particularly regarding a camera of the type using 35 mm cartridge-contained film and having incorporated therein an electric motor drive apparatus for automatic winding and rewinding of the film, in order to provide a body structure capable of incorporating unit type dry batteries of relatively large capacity therein without causing the bulk and size of the camera to be unduly increased. To achieve this, the present invention proceeds from the fact that the longitudinal length or height of the 35 mm film cartridge (about 48 mm) which restricts the height of the camera housing is nearly equal to that of the penlight (size AA) battery (about 50 mm).

DETAILED DESCRIPTION OF THE PREFERRED EMBODIMENT

Figure 1:
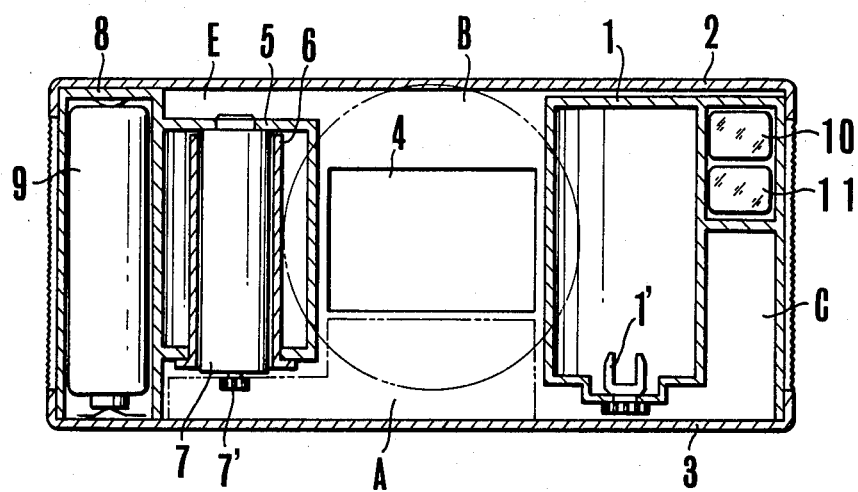
FIG. 1 is a vertical sectional view of one embodiment of the body structure of a camera according to the present invention.

The present invention will be described in greater detail in connection with an embodiment thereof illustrated in the drawings.

In FIG. 1 there is shown one embodiment of the body structure of a camera according to the present invention with the omission of an objective lens, a shutter and a release mechanism for the purpose of clarity of the layout of the camera body. In this figure, 1 is a film cartridge chamber which accommodates a 35 mm film cartridge 12 shown in FIG. 2. 1' is a rewinding fork arranged on the bottom of the cartridge chamber 1. 2 is an upper cover portion of the camera housing; and 3 is a bottom cover portion of the same. 4 is an opening (aperture) for exposure; 5 is a film winding chamber provided with a takeup spool 6 on which the film 13 is convoluted as it is transported from the above-described cartridge cahmber 1 past the aperture 4 to the winding up chamber 5. 7 is an electric motor as a drive source contained in a hollow core of the takeup spool 6 and 7' is its output shaft. 8 is a battery chamber which accommodates two penlight (size AA) batteries 9 in parallel relation as shown in the figure. 10 is a finder in the form of, for example, the inverted Galilean type. 11 is a framing window therefor. Of the spaces in the interior of the camera body there are included a space A which is occupied by the film advancing and shutter charging mechanisms, and a space B which is occupied by the exposed film frame number counting mechanism. In a space C below the finder portion 10, 11 there is arranged an electrical circuit device, and in a space E between the windingup chamber 5 and the upper panel of the housing the release mechanism.

As indicated above, in a small camera of the type to which the invention relates exemplified in the embodiment illustrated in FIG. 1, the spaces necessary to fulfill the functions of the camera and the spaces unavoidably resulting from the construction and arrangement of the camera are all effectively utilized in achieving a minimization of the height of the camera housing to the ultimate limit at the size of the cartridge.

Figure 2:
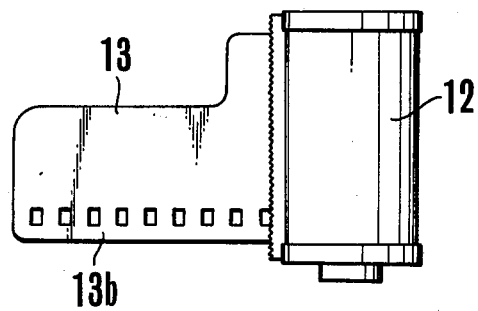
FIG. 2 is an elevational view of a 35 mm film cartridge.

With the cartridge chamber 1 oriented to accept the downward pointed cartridge 12 as shown in FIG. 1 so that the projected end of the spool in the cartridge engages the rewinding fork 1 on the bottom of the chamber 1, the space A becomes larger than the space B. Therefore, the mechanical portions in the camera which necessitate the largest space, namely, the film winding and rewinding mechanism associated with the shutter charge mechanism can be arranged in this wide space A with an additional advantage that as the leader portion 13b of the film 13 extends from the lower half of the film width as shown in FIG. 2, a signal representing the section of the film in alignment with the aperture 4 can be read out prematurely from the perforations in the film lead 13b.

It is noted that the winding up of the film is carried out by transmitting motion of the motor 7 to the takeup spool 6 through an intermediary known in the art, and the rewinding of the film is carried out likewise by the motor 7 as its motion is transmitted to the rewinding fork 1' through an intermediary known in the art.

The space B though narrow as shown in the drawing is made, in the camera of the invention, devoid of the finder system, as it is transposed to the outside or opposite side of the cartridge chamber 1 to the aperture 4, and therefore can be utilized in positioning the exposed film frame number counting mechanism and the like. This location is also convenient for providing a counter display on the top panel 2 of the camera housing and facilitates controlling the operation of the counter in accordance with the advancement of the film 13.

The space E results from the difference between the heights of the cartridge chamber 1 and the winding up chamber 5 and in view of the arrangement of a release button on the top panel of the camera housing at a convenient point or position, it can be utilized in arranging a release mechanism cooperating therewith.

It should be pointed out that in the small size camera of the invention the arrangement of the finder 10 at a point of position outwardly of the cartridge chamber 1 makes it possible to shorten the height of the camera housing to a value restricted only by the film cartridge 12 from as compared to when the finder 10 is positioned in vertical alignment with the aperture 4, or just above the cartridge chamber 1 as in the conventional camera of this type. The positioning of the finder as shown in the drawing is somewhat disadvantageous from the viewpoint of occurring parallax, but is more advantageous for holding the camera in the horizontal as well as vertical position. It is noted that the viewfinder window 10 and the rangefinder window 11 may be replaced one with the other. The parallax correction of the finder framework can be made by a known technique.

As has been described above in detail, the present invention enables construction of the camera body in such a form that upon conception of the fact that the size of the 35 mm film cartridge in the longitudinal direction is approximate to the height of the penlight (size AA) battery, the height of a space which accommodates said dry battery is made almost coincident with the height of the camera housing which is determined to be nearly equal to the height of the cartridge, and that the finder is not located above the aperture, whereby it is made possible to locate the film winding and rewinding mechanism, the shutter charge mechanism, the exposed film frame number counting mechanism, the release mechanism and the like without leaving unused space. This leads to the further advantages of the invention that the portability and manageability of the camera can be largely improved, and that with horizontal and vertical shots, the camera can be grasped quickly and very easily.

While a specific embodiment of the invention has been shown and described in detail to illustrate the application of the inventive principles, it will be understood that the invention may be embodied otherwise without departing from such principles.

What is claimed is:

1. A camera capable of utilizing film in a cartridge and having incorporated therein an electric motorized drive mechanism for automatically winding and rewinding said film comprising:
    a camera body having an upper cover portion and a bottom cover portion;
    an opening window for effecting film exposure formed in a generally central portion of said camera body;
    a cartridge camera arranged along one of the shorter sides of said opening window;
    a film winding chamber arranged along the other shorter side of said opening window and a drive source contained in a takeup spool in said film winding chamber;
    a finder arranged in said camera body, said finder being surrounded by said upper cover portion and said bottom cover portion and being positioned outside of a space defined by said cartridge chamber and said film winding chamber; and
    a battery-containing chamber arranged in said camera, said battery-containing chamber being surrounded by said upper cover portion and said bottom cover portion and being positioned outside of a space defined by said cartridge chamber and said film winding chamber, said battery-containing chamber having a dimension in height almost equal to the axial dimension of said cartridge chamber.

2. A camera according to claim 1 wherein said cartridge chamber is provided with a rewinding fork which is located on the bottom thereof.

3. A camera according to claim 2, wherein said camera accommodates an exposed film frame number counting mechanism and a release mechanism in a space above said exposure opening window, and an electric motorized drive mechanism for winding and rewinding film and a shutter charge mechanism in a space below said exposure opening window.

4. A camera according to claim 3, wherein said battery containing chamber accommodates penlight (size AA) batteries.

* * * * *